(12) United States Patent
Mazurkiewicz

(10) Patent No.: US 6,435,435 B1
(45) Date of Patent: Aug. 20, 2002

(54) APPARATUS FOR COMMINUTION OF SOLID MATERIALS USING A PROCESSOR-CONTROLLED LIQUID JET

(75) Inventor: Marian Mazurkiewicz, Wilkes Barre, PA (US)

(73) Assignee: Cornerstone Technologies, L.L.C., Wilkes Barre, PA (US)

( * ) Notice: Subject to any disclaimer, the term of this patent is extended or adjusted under 35 U.S.C. 154(b) by 0 days.

(21) Appl. No.: 09/578,736

(22) Filed: May 25, 2000

(51) Int. Cl.$^7$ .............................. B02C 19/00; B02C 1/10
(52) U.S. Cl. ........................ 241/301; 144/208.3; 241/1; 241/3; 241/28; 175/67; 175/393; 175/424
(58) Field of Search ........................ 144/208.3; 241/1, 241/69, 21, 28, 301, DIG. 31, 3; 406/14, 106–109; 175/67, 393, 424

(56) References Cited

U.S. PATENT DOCUMENTS

| 4,369,850 A | 1/1983 | Barker |
| 5,024,386 A | 6/1991 | Morris ........................... 241/3 |
| 5,035,362 A | 7/1991 | Mazurkiewicz ................ 241/1 |
| 5,115,983 A | 5/1992 | Rutherford, Sr. .............. 241/1 |
| 5,178,496 A | 1/1993 | Trieb et al. .................... 406/14 |
| 5,341,996 A | 8/1994 | Rutherford, Sr. ........ 241/301 X |
| 5,482,215 A | 1/1996 | Veres .............................. 241/1 |
| 5,683,038 A | 11/1997 | Shinal ............................ 241/1 |
| 5,887,667 A | 3/1999 | Van Zante et al. |

FOREIGN PATENT DOCUMENTS

| CA | 2104723 | 2/1995 |
| DE | 198 18 566 | 10/1999 |
| WO | WO 92/15438 | 9/1992 |
| WO | WO 96 05039 A | 2/1996 |

Primary Examiner—W Donald Bray
(74) Attorney, Agent, or Firm—Sterne, Kessler, Goldstein & Fox PLLC (57) ABSTRACT

The present invention is directed to a tire comminution apparatus that is of simple construction and that can be operated without excessive maintenance. According to the present invention, a vehicle tire of any size or composition can be comminuted with essentially the same comminution apparatus. The comminution apparatus includes a freely moving lance with a nozzle for transforming a liquid into a high velocity liquid jet. The lance is positioned and controlled such that the liquid jet impacts the tire thereby separating it into its component parts. The comminution apparatus may be computer controlled.

13 Claims, 7 Drawing Sheets

APPARATUS FOR COMMINUTION OF SOLID MATERIALS USING A PROCESSOR-CONTROLLED LIQUID JET

BACKGROUND OF THE INVENTION

1. Field of the Invention

The present invention relates generally to the comminution of solid materials. More particularly, this invention relates to an apparatus used to reduce the size of solid materials into smaller components by means of a processor-controlled liquid jet. More particularly, the present invention relates to an apparatus for separating a vehicle tire into its components using a processor-controlled high velocity liquid jet.

2. Related Art

The disposal of used vehicle tires presents an ever increasing environmental concern. In California alone, over 28 million tires require disposal each year. A tire disposal apparatus and process that balances an environmentally friendly and cost effective approach is crucial to the resolution of this problem.

Traditional methods of tire disposal include burying tires in landfills, either whole or shredded. The disadvantage to burying whole tires is the tremendous volume of space they occupy in already scarce landfills. In addition, whole tires have a tendency to resurface over time when the dirt with which they are covered settles. Shredded tires take up less space in landfills, however, the cost of shredding tires is quite high due to the high capital expense of current tire shredding machinery and the high maintenance costs associated therewith. Burying tires, whole or shredded, also results in the waste of useful material that may be reclaimed from the tires, such as rubber and steel.

As mentioned above, new tire disposal methods are needed that do not tax scarce landfill space and that efficiently reclaim the material of used tires. There are various uses for the reclaimed materials of tires. For instance, crumb rubber may be used in asphalt to make roads smoother and quieter, in new tires and retreads, in composite materials such as thermoplastics and in various industrial applications including the production of roofing materials, siding, automotive parts, flooring and electrical insulation. To this end, an alternative to burying tires has been to use spent tires as a fuel source as Tire Derived Fuel (TDF) in power and cement plants. If tire rubber is burned in furnaces at high temperatures, it will produce energy without noxious fumes. However, in order to achieve an efficient burn with less noxious by-products, the tire rubber must be separated from the other materials of which it is comprised, i.e., the fabric and steel used to reinforce the tread and sidewalls of the tire. Once again, apparatus and methods are currently available to perform such functions, but the machinery is expensive and requires constant maintenance due to the inherent toughness of tires, the variation in materials of which tires are comprised and the various sizes of vehicle tires.

Therefore, what is needed is an economical apparatus for comminuting a tire into the materials of which it is constructed. Further, what is needed is an apparatus that is affordable and easily maintained as well as usable by a variety of users in a variety of locations, i.e., within automobile and truck tire manufacturing facilities, in tire reclamation facilities, etc.

SUMMARY OF THE INVENTION

The present invention is directed to a comminution apparatus that is of a simple construction and that can be operated without excessive maintenance. According to the present invention, a vehicle tire of any size or composition can be comminuted with essentially the same comminution apparatus. The comminution apparatus includes a freely moving lance with a nozzle for transforming a liquid into a high velocity liquid jet. The lance is positioned and controlled such that its liquid jet impacts the tire thereby separating it into its component parts.

The comminution apparatus is comprised of two concentric cylindrical tubes that each rotatably support a bearing plate in an interior area thereof. The bearing plates are a distance L apart and rotate at variable speeds $n_1$ and $n_2$ respectively. Each bearing plate includes a bearing in a bearing passage that is located a distance $r_1$ and $r_2$ respectively from a longitudinal center axis X—X of the concentric cylindrical tubes. The bearings support a lance that is comprised of a flexible hose at an upper end thereof and a nozzle at a lower end thereof.

As the bearing plates rotate, clockwise or counterclockwise the lance orbits about center axis X—X. A flexible hose which is attached to an upper portion of the lance accommodates the orbital movement of the lance which translates into the movement of the liquid jet emanating from the lance nozzle. By varying bearing plate speeds $n_1$ and $n_2$, distance L and a third variable S (the stand-off distance between the nozzle exit and the article to be comminuted), the liquid jet distribution patterns can be adjusted as necessary to achieve effective tire comminution.

The comminution of the tire may be computer controlled through the use of an imaging device that constantly monitors the comminution process and redirects the liquid distribution of the lance as necessary to efficiently reclaim the material of the tire. Upon completion of the initial comminution process, the tire materials are separated and possibly further processed by additional high velocity liquid jets in a process such as the one described in co-pending application Ser. No. 09/413,489 filed Oct. 6, 1999, incorporated herein in its entirety by reference.

The comminution apparatus of the present invention is of a relatively simple construction and is not subject to the excessive mechanical wear associated with current tire shredding machinery. Further, the tire comminution apparatus of the present invention readily accommodates whole tires of varying sizes without the additional cost or time associated with cutting up a tire into strips or debeading a tire, as required by many of the current tire comminution apparatus.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and together with the description further serve to explain the principles of the invention and to enable a person skilled in the pertinent art to make and use the invention.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other applications.

Figure 1:
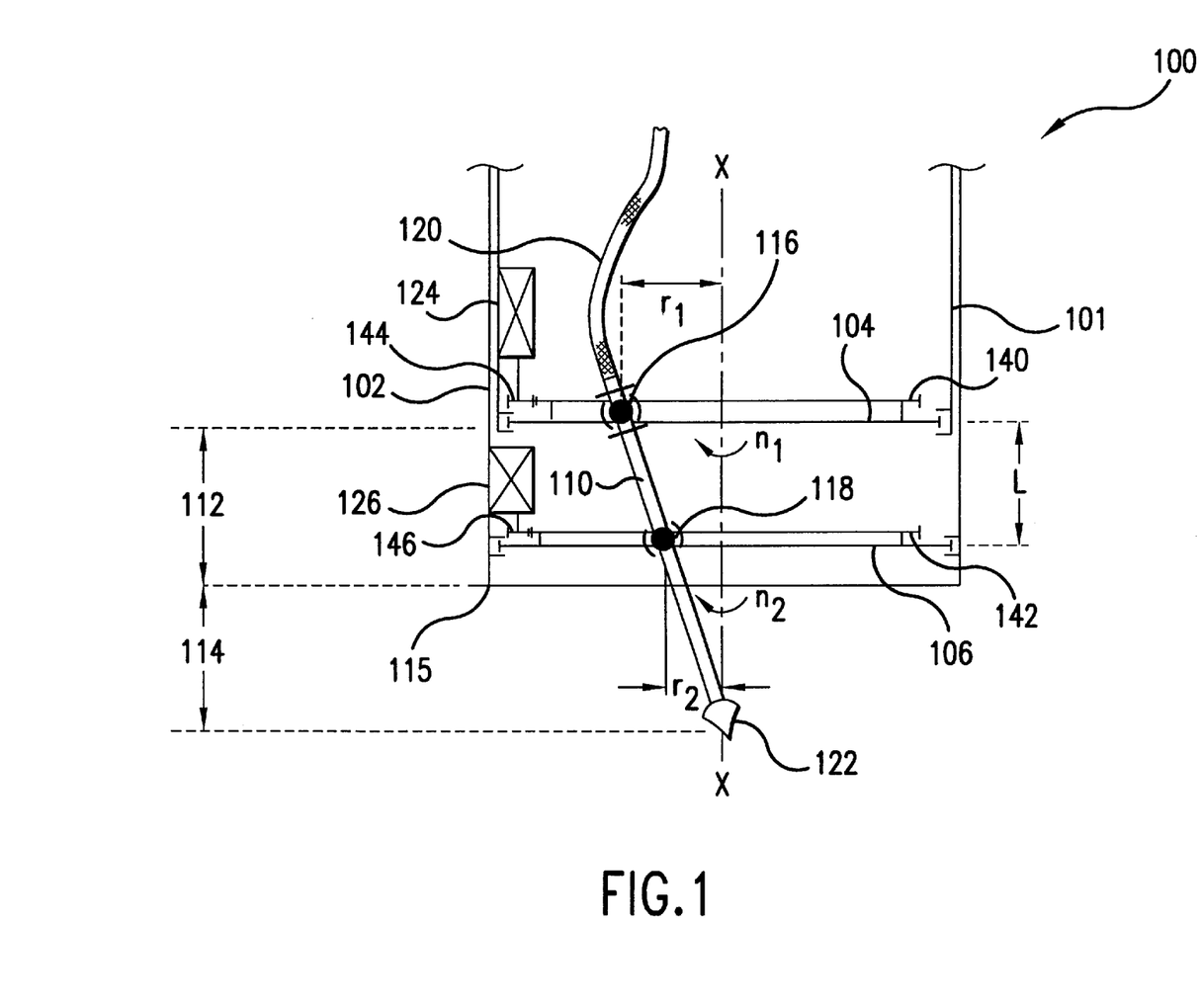
FIG. 1 is schematic diagram of an apparatus for comminution of solid materials of the present invention.

FIG. 1 is schematic diagram of an apparatus for comminution of solid materials of the present invention. Comminution apparatus 100 is particularly useful in the comminution of used vehicle tires into their component parts. In another embodiment, the comminution apparatus may be used to comminute anthracite, silicon rods used in the production of semi-conductor chips, organic material such as wood or a variety of other materials as would be apparent to one skilled in the relevant art.

Comminution apparatus 100 is comprised of an inner cylindrical tube 101 and an outer cylindrical tube 102 that are concentric about longitudinal axis X—X, as shown in FIG. 1. Outer cylindrical tube 102 has an internal diameter of between 2 inches and 2 feet depending on the material to be comminuted and the application in which comminution apparatus 100 is to be used. The internal diameter of inner cylindrical tube 101 will be less than that of outer cylindrical tube 102 to accommodate its being positioned within outer cylindrical tube 102.

An upper bearing plate 104 is rotatably supported within the interior area of inner cylindrical tube 101 and a lower bearing plate 106 is rotatably supported within the interior area of outer cylindrical tube 102. Upper and lower bearing plates 104 and 106 are spaced distance L apart.

As shown in FIG. 1, a lance 110 has an internal portion 112 that is supported by upper and lower bearing plates 104 and 106 and an external portion 114 that extends beyond a lowermost portion 115 of cylindrical tube 102. Lance internal portion 112 is supported by an upper bearing 116 of upper bearing plate 104 and a lower bearing 118 of lower bearing plate 106. Upper bearing 116 is distance $r_1$ from the longitudinal center axis X—X of inner and outer cylindrical tubes 101 and 102. Lower bearing 118 is distance $r_2$ from the longitudinal center axis X—X. In an alternate embodiment of the present invention, distances $r_1$ and $r_2$ may be radially adjustable so as to allow lance 110 to be repositioned, thereby providing a greater radial range of liquid jet trajectories for the effective comminution of solid materials.

Figure 6:
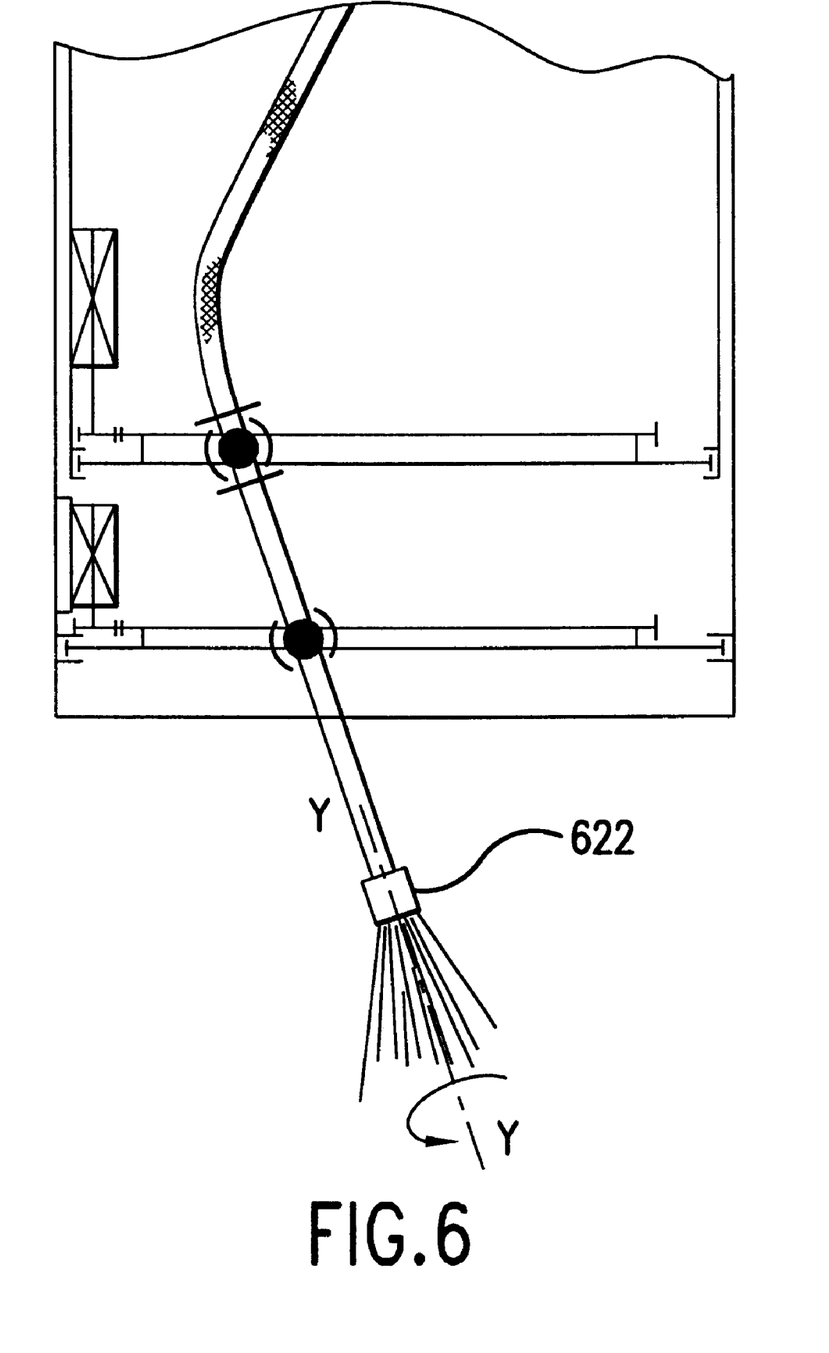
FIG. 6 is a schematic diagram of a revolving nozzle head.

Lance internal portion 112 is attached to a flexible hose 120 on an upper portion thereof. Lance external portion 114 includes a nozzle 122 which transforms a liquid supplied through flexible hose 120 into a high velocity liquid jet. Nozzle 122 may be comprised of a nozzle block with multiple stable nozzles attached thereto. In a further embodiment, nozzle 622 may be either a self-revolving nozzle head or a driven nozzle head with an independent motor that revolves around axis Y—Y, as shown in FIG. 6. Further, it will become apparent to one skilled in the relevant art to utilize a combination of rotating nozzle heads and stable nozzle heads in accordance with the present invention to accommodate various comminution applications.

As mentioned above, upper and lower bearing plates 104 and 106 are rotatably supported by inner and outer cylindrical tubes 101 and 102 respectively. Upper and lower bearing plates 104 and 106 include means by which each is rotated by step motors 124 and 126 respectively. For instance, each bearing plate may include gears 140 and 142 which mesh with respective gears 144 and 146 of step motors 124 and 126, as schematically represented in FIG. 1. Step motors 124 and 126 can be any commercially available stepper motor system, such as the PE Series stepper motors manufactured by Nippon Pulse Motor Co., Ltd. of Radford, Va., that can be adapted for use in the present invention. Step motor 124 rotates upper bearing plate 104 at speed $n_1$ and step motor 126 rotates lower bearing plate 106 at speed $n_2$, wherein speeds $n_1$ and $n_2$ may be independently varied.

Figure 2:
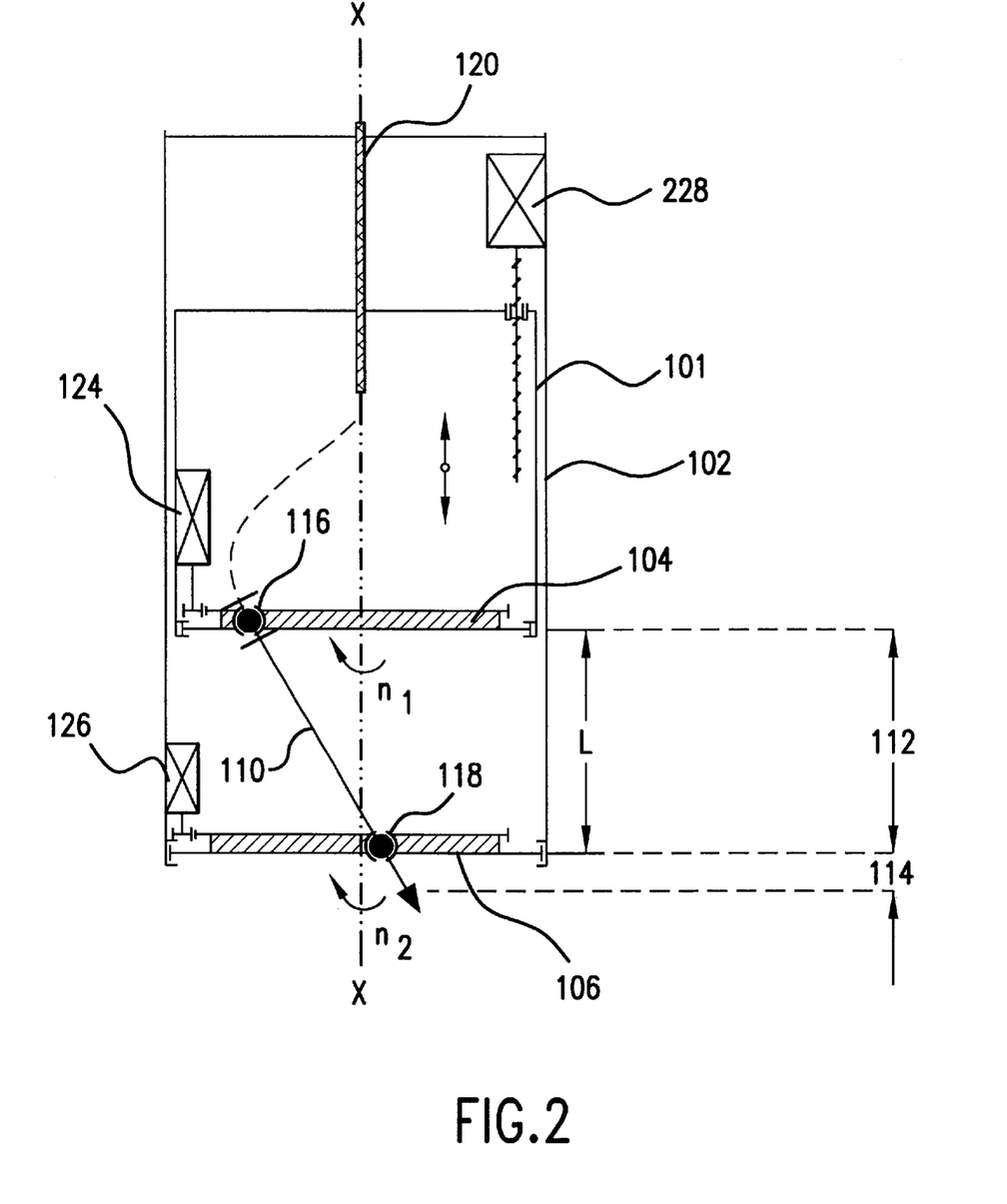
FIG. 2 is a schematic diagram of an alternate embodiment of the apparatus of FIG. 1 wherein distance L is adjustable.
Figure 2A:
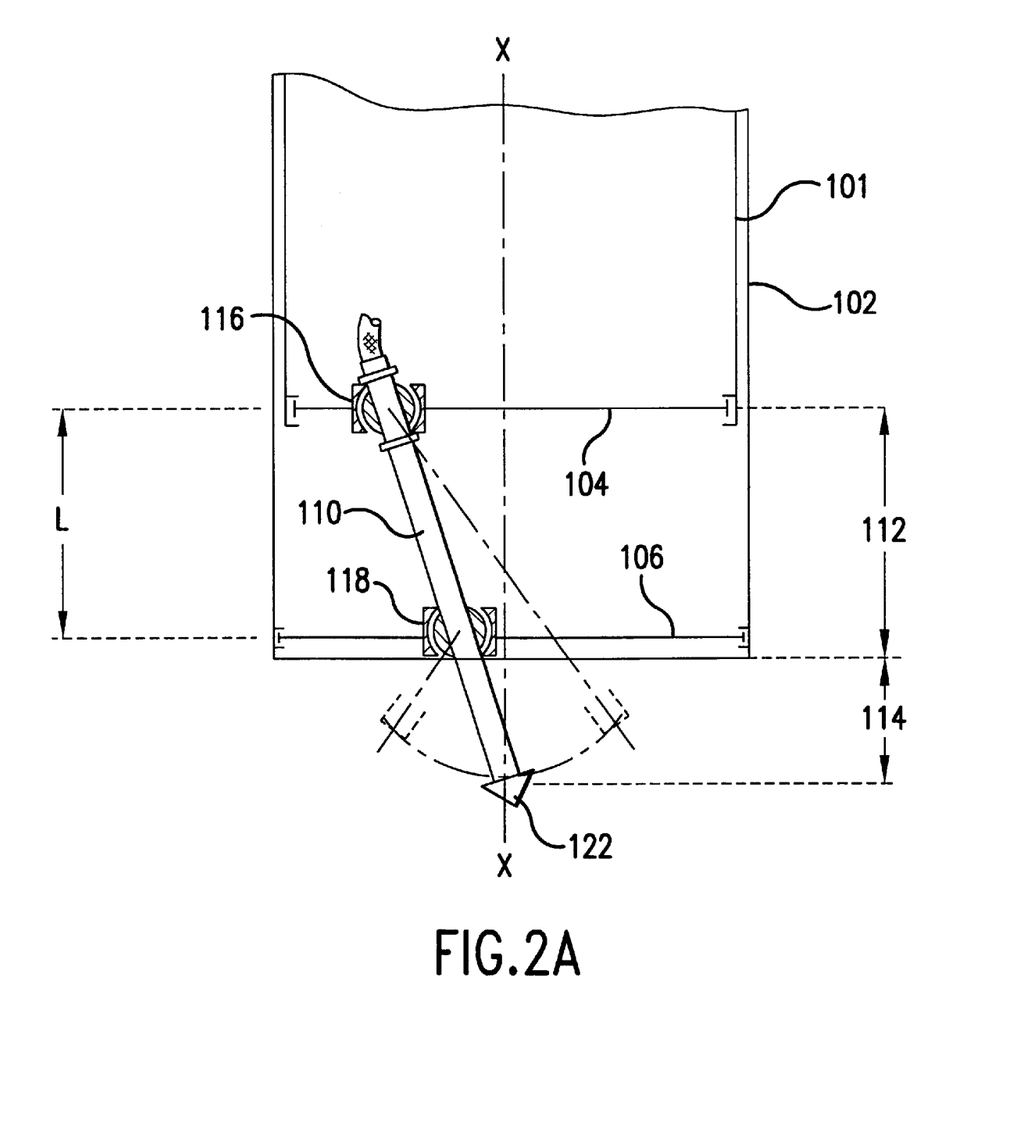
FIG. 2A is a schematic diagram of the bearings of FIG. 2.
Figure 3A:
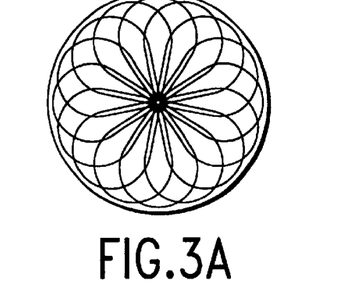
FIG. 3A illustrates a random distribution pattern of the processor-controlled liquid jet of FIG. 2.
Figure 3B:
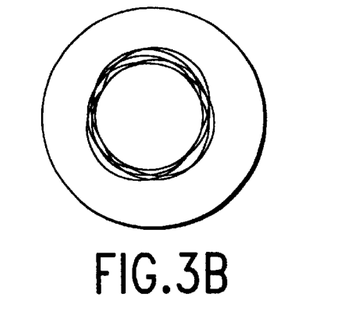
FIG. 3B illustrates a ring distribution pattern of the processor-controlled liquid jet of FIG. 2.
Figure 3C:
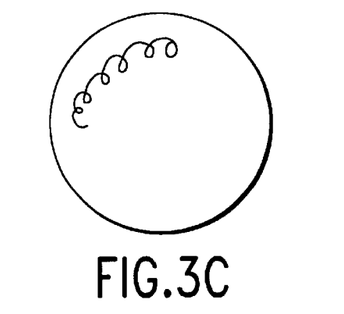
FIG. 3C illustrates a sectional distribution pattern of the processor-controlled liquid jet of FIG. 2.
Figure 3D:
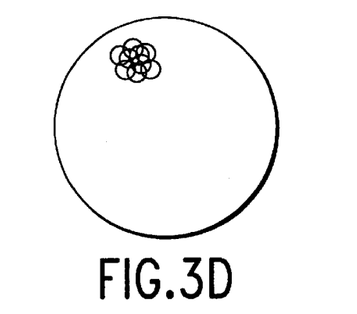
FIG. 3D illustrates a circular distribution pattern of the processor-controlled liquid jet of FIG. 2.
Figure 3E:
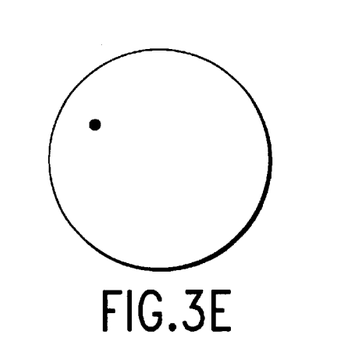
FIG. 3E illustrates a point distribution pattern of the processor-controlled liquid jet of FIG. 2.
Figure 3F:
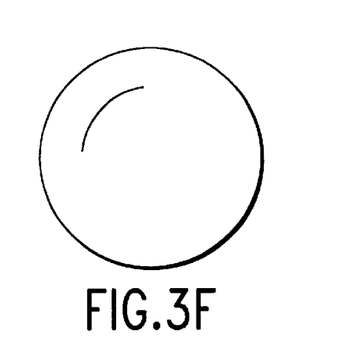
FIGS. 3F and 3G illustrate various linear distribution patterns of the processor-controlled liquid jet of FIG. 2.
Figure 3G:
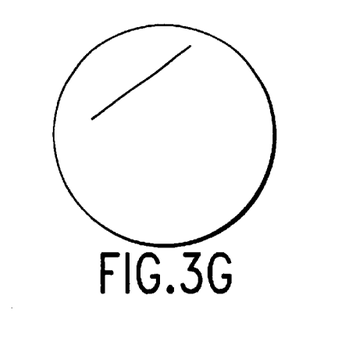

FIG. 2 is an alternate embodiment of the present invention wherein distance L is adjustable by step motor 228. Step motor 228 raises and lowers inner cylindrical tube 101 within outer cylindrical tube 102 to vary distance L. Inner cylindrical tube 101 may "slide" along outer cylindrical tube 102, or be supported by outer cylindrical tube 102 by means known to one of ordinary skill in the art, such as by rollers interposed between the two tubes. In this embodiment, step motor 124 rotates upper bearing plate 104 at speed $n_1$ and step motor 126 rotates lower bearing plate 106 at speed $n_2$. As shown in FIG. 2A, an upper bearing 116 prohibits lance 110 from sliding axially. However, a lower bearing 118 allows axial movement between upper and lower bearing plates 104 and 106 as distance L is adjusted.

Flexible hose 120 flexes to allow lance internal portion 112 to orbit about longitudinal center axis X—X while supported by bearings 116 and 118 that move within rotating upper and lower bearing plates 104 and 106 respectively. The movement of lance internal portion 112 about the longitudinal center axis X—X of inner and outer cylindrical tubes 101 and 102 translates into the movement of lance external portion 114. By adjusting bearing plate speeds $n_1$ and $n_2$ and/or distance L, the trajectory of nozzle 122 of lance external portion 114 may be controlled so that the distribution of the liquid jet on the surface of the material to be comminuted may be varied as shown in FIGS. 3A–3G.

FIGS. 3A–3G represent various liquid jet trajectory distributions that can be achieved by varying upper bearing plate speed $n_1$, lower bearing plate speed $n_2$ and/or distance L. The liquid jet distribution can be set a priori or determined automatically by computer controlled monitoring of the material to be comminuted during the comminution process.

Such computer controlled monitoring can be performed by the computer system described below.

Figure 5:
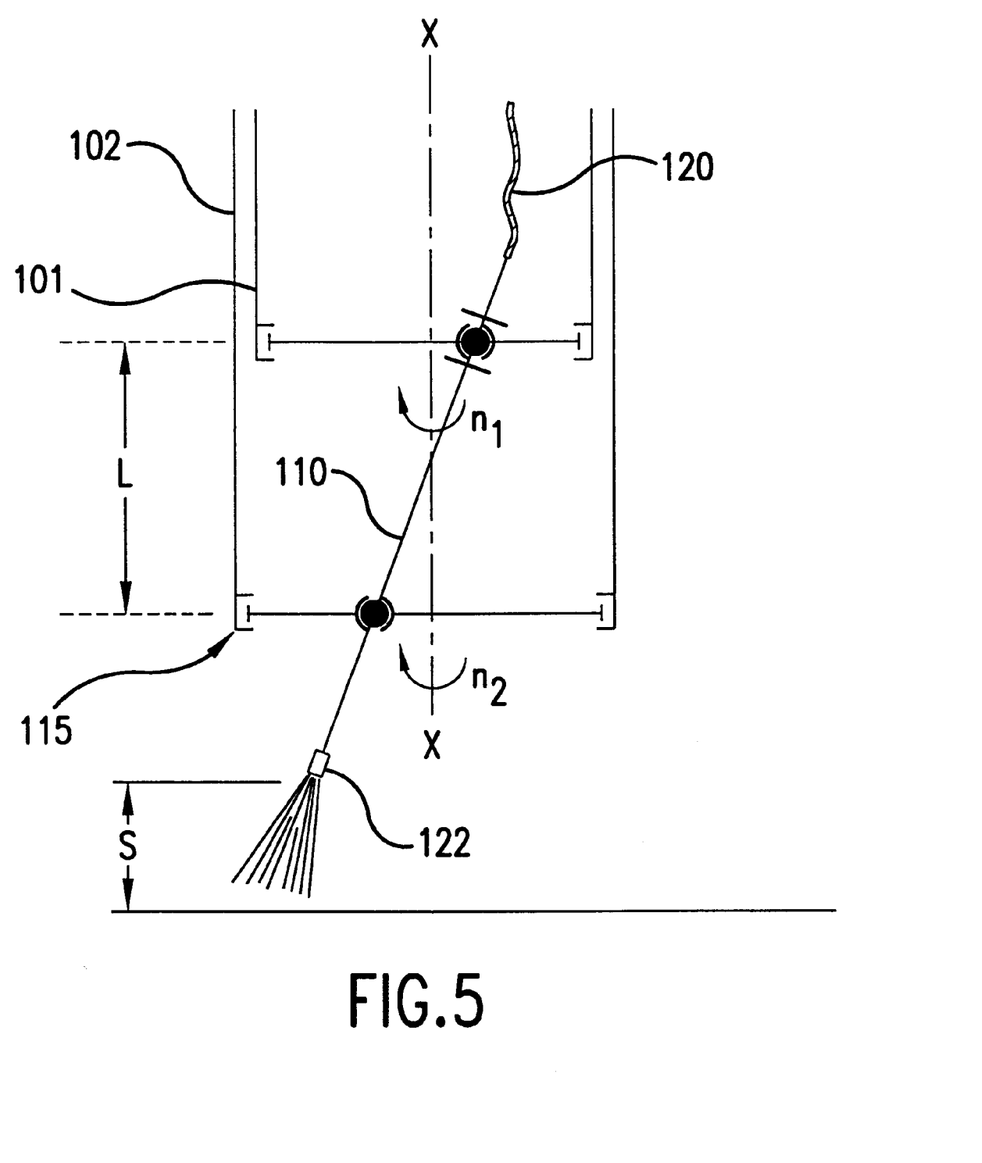
FIG. 5 is a schematic diagram of an alternate embodiment of the apparatus of FIG. 1 wherein stand-off distance S is adjustable.

In an alternate embodiment of the present invention as shown in FIG. 5, the stand-off distance S between the nozzle exit and the material to be comminuted may be adjusted by moving either lance 110 or the material to be comminuted. In this way, another parameter may be controlled to provide further adjustment and refinement of the liquid jet trajectory distribution during the comminution process.

Figure 4:
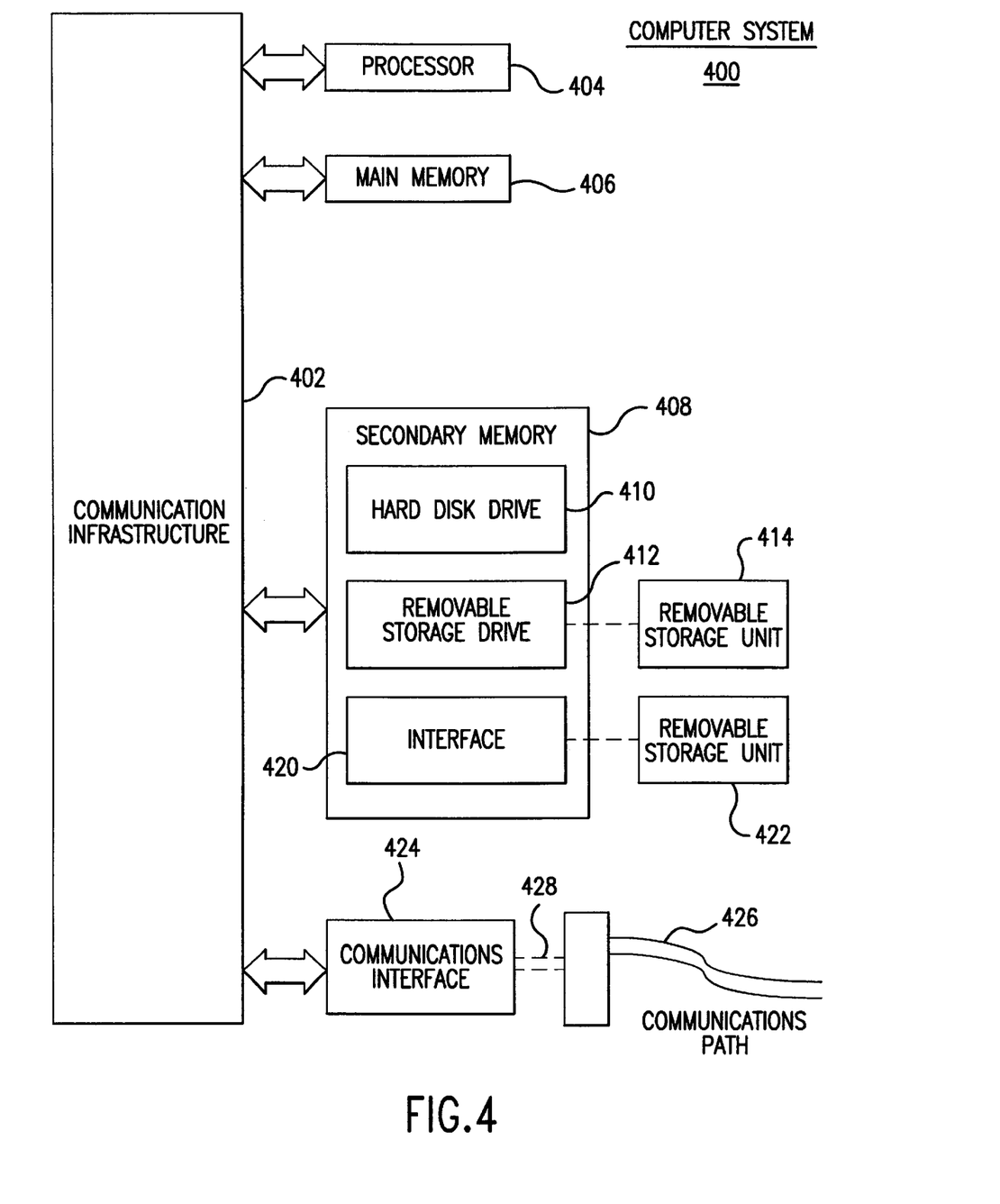
FIG. 4 is an example of a computer system that could be used for computer controlled monitoring of comminution of solid materials in accordance with the present invention.

Referring to FIG. 4 and as discussed above, an example of a computer system 400 that can be used to control the comminution process is shown. Computer system 400 includes one or more processors, such as processor 404. Processor 404 is connected to a communications infrastructure 402. After reading this description, it will become apparent to a person skilled in the relevant art how to implement the invention using other computer systems and/or computer architectures.

Computer system 400 also includes a main memory 406, preferably random access memory (RAM), and can also include a secondary memory 408. Secondary memory 408 can include, for example, a hard disk drive 410 and/or a removable storage drive 412, representing a floppy disk drive, a magnetic tape drive, an optical disk drive, etc. Removable storage drive 412 reads from and/or writes to a removable storage unit 414 in a well-known manner. Removable storage unit 414, represents a floppy disk, magnetic tape, optical disk, etc. which is read by and written to by removable storage drive 412. Removable storage unit 414 includes a computer usable storage medium having stored therein computer software and/or data.

In alternative embodiments, secondary memory 408 can include other similar means for allowing computer programs or other instructions to be loaded into computer system 400. Such means can include, for example, a removable storage unit 422 and an interface 420. Examples of such can include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 can also include a communication interface 424. Communication interface 424 allows software and data to be transferred between computer system 400 and external devices. Examples of communication interface 424 include, but are not limited to a modem, a network interface (such as an Ethernet card), a communications port, a PCM-CIA slot and card, etc. Software and data transferred via communication interface 424 are in the form of signals which can be electronic, electromagnetic, optical or other signals capable of being received by communication interface 424. These signals 426 are provided to communications interface via a channel 428. This channel 428 carries signals 426 and can be implemented using wire or cable, fiber optics, a phone line, a cellular phone link, an RF link and other communications channels. Moreover, computer system 400 can be directly controlled or programmed by a main comminution computer (not shown) via communication interface 424.

Data concerning the material being comminuted may be collected by known optical, resonant and/or thermal imaging apparatus. Particularly, the use of data collection apparatus that can be used to detect color variation in a tire being comminuted so as to redirect the lance as rubber removal exposes the interior white layer of the tire. The collected data is then processed by computer system 400 via communication interface 424. Computer system 400 can be programmed to determine the appropriate liquid jet distribution based on this data so as to control lance 110 and the comminution process.

In this document, the terms "computer program medium" and "computer usable medium" are used to generally refer to media such as removable storage device 412, a hard disk installed in hard disk drive 410, and signals 426. These computer program products are means for providing software to computer system 400.

Computer programs (also called computer control logic) are stored in main memory and/or secondary memory 408. Computer programs can also be received via communication interface 424. Such computer programs, when executed, enable the computer system 400 to perform the features of the present invention as discussed herein. In particular, the computer programs, when executed, enable the processor 404 to perform the features of the present invention, such as controlling the comminution process by varying the liquid jet distribution on the material being comminuted. Accordingly, such computer programs represent controllers of the computer system 400.

In an embodiment where the invention is implemented using software, the software can be stored in a computer program product and loaded into computer system 400 using removable storage drive 412, hard drive 410 or communication interface 424. The control logic (software), when executed by the processor 404, causes the processor 404 to perform the functions of the invention as described herein.

In another embodiment, the present invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

EXAMPLE

In one example, a tire may be comminuted by the comminution apparatus operating in the following ranges:

$n_1$=5 rev./sec.

$n_2$=10 rev./sec.

L=6–8 in.

S=3–10 in.

wherein $r_1$=1", $r_2$=4" and the internal diameter of the outer cylindrical tube is 10". The tire may be separated into its constituent parts and comminuted into pieces with an average mesh size of between 40 to 200.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. An apparatus for comminuting a material, comprising:

an outer cylindrical tube having a first interior area;

an inner cylindrical tube, concentric with and positioned within the outer cylindrical tube, having a second interior area;

an upper bearing plate rotatably supported within the second interior area of the inner cylindrical tube;

a lower bearing plate rotatably supported within the first interior area of the outer cylindrical tube and spaced a distance L below the upper bearing plate; and a lance having an internal portion supported by the upper and lower bearing plates and an external portion that freely extends beyond a lowermost portion of the cylindrical tube and directs a high velocity liquid jet at the material to be comminuted.

2. An apparatus for comminuting a material as described in claim 1, wherein each of the upper and lower bearing plates has a bearing through which the internal portion of the lance passes and is supported.

3. An apparatus for comminuting a material as described in claim 2, wherein the bearing of the upper bearing plate is a distance $r_1$ from a common center axis of the inner and outer cylindrical tubes and the bearing of the lower bearing plate is a distance $r_2$ from the common center axis of the inner and outer cylindrical tubes.

4. An apparatus for comminuting a material as described in claim 1, wherein the internal portion of the lance further comprises a flexible hose.

5. An apparatus for comminuting a material as described in claim 1, wherein the external portion of the lance further comprises a nozzle.

6. An apparatus for comminuting a material as described in claim 5, wherein the nozzle transforms a liquid into a high velocity liquid jet.

7. An apparatus for comminuting a material as described in claim 1, wherein the distance L is adjustable.

8. An apparatus for comminuting a material as described in claim 1, wherein the upper bearing plate rotates at a speed of $n_1$ and the lower bearing plate rotates at a speed of $n_2$.

9. An apparatus for comminuting a material as described in claim 8, wherein the speed of $n_1$ and the speed of $n_2$ are different.

10. An apparatus for comminuting a material as described in claim 1, wherein the material to be comminuted is a distance S from a lowermost portion of the external portion of the lance.

11. An apparatus for comminuting a material as described in claim 10, wherein the distance S is adjustable by moving either of the lance or the material to be comminuted.

12. An apparatus for comminuting a material as described in claim 1, further comprising a processor and an imaging device attached to the cylindrical tube, wherein the processor is responsive to the imaging device and controls a trajectory of the high velocity liquid accordingly.

13. An apparatus for comminuting a material, comprising:

an outer cylindrical tube;

an inner cylindrical tube concentric with and positioned within the outer cylindrical tube;

an upper bearing plate rotatably supported by the inner cylindrical tube having a first bearing a distance $r_1$ from a common longitudinal center axis of the inner and outer cylindrical tubes;

a lower bearing plate rotatably supported by the outer cylindrical tube and spaced a distance L from the upper bearing plate and having a second bearing a distance $r_2$ from the common longitudinal center axis;

a lance having an internal portion and an external portion capable of transforming a liquid into a high velocity liquid jet, wherein the internal portion is supported by the first and second bearing passages; and a flexible hose attached to the lance such that the independent rotation of the upper bearing plate and the lower bearing plate allows the lance to freely move.

* * * * *

UNITED STATES PATENT AND TRADEMARK OFFICE
CERTIFICATE OF CORRECTION

PATENT NO. : 6,435,435 B1 Page 1 of 1
DATED : August 20, 2002
INVENTOR(S) : Mazurkiewicz It is certified that error appears in the above-identified patent and that said Letters Patent is hereby corrected as shown below:

Column 1,
Line 5, before the subtitle "Background of the Invention," the following subtitle and paragraph should be entered:

-- STATEMENT REGARDING FEDERALLY-SPONSORED
RESEARCH AND DEVELOPMENT

The U.S. Government has a paid-up license in this invention and the right in limited circumstances to require the patent owner to license others on reasonable terms as provided for by the terms of one or more of the following contracts: Contract No. N00014-99-C-0277, Contract No. N00014-01-C-0245, Contract No. N00014-01-C-0245, Contract No. N00014-01-C-0448 and Contract No. N00014-02-C-0329 awarded by the Office of Naval Research and Subcontract number 4500011933 awarded by Oak Ridge National Laboratory. --

Signed and Sealed this

Sixth Day of May, 2003

JAMES E. ROGAN
*Director of the United States Patent and Trademark Office*